United States Patent
Wamprecht et al.

(10) Patent No.: US 7,196,134 B2
(45) Date of Patent: Mar. 27, 2007

(54) HIGH-SOLIDS BINDER COMBINATIONS FOR SCRATCH-RESISTANT TOPCOATS

(75) Inventors: Christian Wamprecht, Neuss (DE); Markus Mechtel, Bergisch Gladbach (DE); Jörg Tillack, Bergisch Gladbach (DE); Thomas Klimmasch, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 225 days.

(21) Appl. No.: 10/845,685

(22) Filed: May 14, 2004

(65) Prior Publication Data
US 2004/0242741 A1 Dec. 2, 2004

(30) Foreign Application Priority Data
May 20, 2003 (DE) ............... 103 22 620

(51) Int. Cl.
*C08L 31/02* (2006.01)
(52) U.S. Cl. .............. 524/556; 524/386; 524/423; 524/570
(58) Field of Classification Search ........ 524/386, 524/556, 423, 570
See application file for complete search history.

(56) References Cited

U.S. PATENT DOCUMENTS

| | | | |
|---|---|---|---|
| 3,124,605 A | 3/1964 | Wagner | 260/453 |
| 3,183,112 A | 5/1965 | Gemassmer | 106/316 |
| 3,358,010 A | 12/1967 | Britain | 260/453 |
| 3,903,127 A | 9/1975 | Wagner et al. | 260/453 AB |
| 4,205,102 A * | 5/1980 | Akzo N.V. et al. | 427/393.5 |
| 4,221,701 A | 9/1980 | Rasberger et al. | 260/45.8 N |
| 4,264,519 A | 4/1981 | Hennig et al. | 260/453 AB |
| 4,288,586 A | 9/1981 | Bock et al. | 528/67 |
| 4,292,255 A | 9/1981 | Hennig et al. | 260/453 AR |
| 4,324,879 A | 4/1982 | Bock et al. | 528/45 |
| 4,379,905 A | 4/1983 | Stemmler et al. | 528/73 |
| 4,419,513 A | 12/1983 | Breidenbach et al. | 544/222 |
| 4,487,928 A | 12/1984 | Richter et al. | 544/193 |
| 4,518,761 A | 5/1985 | Richter et al. | 528/67 |
| 4,837,273 A * | 6/1989 | Wamprecht et al. | 525/66 |
| 5,268,428 A * | 12/1993 | Wamprecht et al. | 525/207 |
| 5,354,797 A * | 10/1994 | Anderson et al. | 524/285 |
| 5,753,756 A | 5/1998 | Aerts et al. | 525/111.5 |
| 5,914,383 A | 6/1999 | Richter et al. | 528/59 |
| 6,048,936 A | 4/2000 | Epple et al. | 525/124 |
| 6,090,939 A | 7/2000 | Richter et al. | 544/67 |
| 6,107,484 A | 8/2000 | Richter et al. | 544/67 |
| 6,458,885 B1 | 10/2002 | Stengel et al. | 524/507 |
| 6,472,493 B1 | 10/2002 | Huynh-Ba | 528/49 |

FOREIGN PATENT DOCUMENTS

| | | |
|---|---|---|
| CA | 2244486 | 2/1999 |
| DE | 24 17 353 | 10/1975 |
| DE | 198 24 118 C2 | 7/2002 |
| FR | 943411 | 3/1949 |
| GB | 1060430 | 3/1967 |
| GB | 1 234 922 | 6/1971 |
| GB | 1 485 564 | 9/1977 |
| GB | 1 560 373 | 2/1980 |

OTHER PUBLICATIONS

Houben-Weyl, Methoden der Organischen Chemie Methods of Organic Chemistry, $4^{th}$ ed., E 20/2 (month unavailable) 1987, p. 1156-1157, Dr. Gerhard Markert, "Homopolymerisation".

Makromoleküle, by H.G. Elias, $4^{th}$ edition, Hüthig and Wepf-Verlag, Basel, Heidelberg, New York, (date unavailable), pp. 676, 744-746 and 1012-1021.

J. Appl. Polym. Sci., 29 (month unavailable) 1984, pp. 2261-2270, Adolf Balas et al, "Properties of Cast Urethane Elastomers Prepared from Poly(ε-caprolactone)s".

The Chemistry of Organic Filmformers, (month unavailable) 1967, pp. 235-240, D.H. Solomon, "Amine- and Phenol-Formaldehyde Resins".

* cited by examiner

Primary Examiner—David W. Wu
Assistant Examiner—Satya Sastri
(74) Attorney, Agent, or Firm—Joseph C. Gil; Robert S. Klemz

(57) ABSTRACT

High-solids binder combinations comprising polyisocyanates, special lactone-based polyols and polyacrylate-polyols, a process for preparing such binders, and their use for producing coatings.

The lactone-based polyols include ε-caprolactone-based polyols having an average hydroxy functionality $\geq 2$ and a number-average molecular weight of from 119 to 2000 g/mol. The polyacrylate resins are prepared by copolymerizing optionally functional polybutadienes, aromatic monomers, hydroxyalkyl esters of acrylic or methacrylic acid having primary hydroxyl groups, aliphatic esters of acrylic or methacrylic acid and $C_1$ to $C_8$ monoalcohols, α,β-unsaturated $C_3$–$C_7$ monocarboxylic or dicarboxylic acids or of one or more monoesters of maleic acid or fumaric acid and $C_1$ to $C_{14}$ monoalchols.

20 Claims, No Drawings

HIGH-SOLIDS BINDER COMBINATIONS FOR SCRATCH-RESISTANT TOPCOATS

CROSS REFERENCE TO RELATED PATENT APPLICATION

The present patent application claims the right of priority under 35 U.S.C. §119 (a)-(d) of German Patent Application No. 103 22 620.6, filed May 20, 2003.

FIELD OF THE INVENTION

The present invention relates to new high-solids binder combinations comprising polyisocyanates, special lactone-based polyols and polyacrylate-polyols, to a process for preparing them and to their use for producing coatings.

BACKGROUND OF THE INVENTION

High-solids coating formulations are of great interest owing to their low volatile organic solvents fraction. A core problem, however, is the provision of polyols combining a very low viscosity with the conferment on the cured coating of the necessary mechanical properties, such as scratch resistance or hardness and other resistance properties, such as solvent resistance and chemical resistance.

Coating materials based on polyacrylate-polyols score over polyester-polyols particularly in respect of rapid physical drying, good solvent resistance and chemical resistance and also weathering stability. A problem, however, is their comparatively high viscosity. Polyacrylate-polyols of lower viscosity, such as are needed for high-solids coating compositions, are disadvantageous owing to their low molar weight, since the properties of the coatings produced from them are markedly inferior, particularly with regard to simultaneous scratch resistance, acid resistance and surface hardness, to those of conventional polyacrylate-polyols with a greater solvent content.

DE-A 198 24 118 describes low-solvent binders on a polyester acrylate basis which can be cured with di- and/or polyisocyanates to give quick-drying coatings having good adhesion. Owing to the high polyester fraction, however, the acid resistance of these coatings is inadequate and they are unsuitable for use in automotive topcoat materials.

WO 96/20968 describes a coating composition for cars, vans and lorries that comprises a polyacrylate based on alkyl-substituted cycloaliphatic (meth)acrylate monomers or alkyl-substituted aromatic vinyl monomers, a polyhydroxy-functional oligoester and a polyisocyanate. Since, however, owing to their preparation, the oligoesters have a relatively large number of secondary hydroxyl groups as well as primary ones and since it is necessary to use very large amounts of these esters (<60% by weight, based on the overall formulation) for low-viscosity coating compositions (<3000 mPa.s/23° C.), they cure only very slowly and at relatively high temperatures, and so are unsuitable for temperature-sensitive substrates.

EP-A 0 896 991 describes coating compositions based on polyacrylate/polyester blends with polyester fractions $\leq$10% by weight and hydroxyl numbers of 40–125 mg KOH/g. Owing to the resultant low crosslinking density, PU coating materials prepared from them lack sufficient solvent and chemical resistance. Moreover, at 3000–5000 mPas/23° C. for a solids content of 70% by weight, the viscosity is too high for the formulation of high-solids PU coating materials.

The present invention was therefore based on the object of providing new binder compositions which have the known advantages of such based on the high molecular weight polyacrylate-polyols but at the same time are of such low viscosity that they are suitable for the preparation of low-solvent coating materials.

SUMMARY OF THE INVENTION

The present invention is directed to binder compositions that include

A) one or more hydroxy-functional polyacrylate resins,

B) one or more ε-caprolactone-based polyols having an average hydroxy functionality $\geq$2 and a number-average molecular weight of from 119 to 2000 g/mol, and C) one or more crosslinkers reactive with OH groups and having an average functionality >1.

The polyacrylate resins of component A) are prepared by copolymerizing:

a) 0–10 parts by weight of one or more, optionally functional, polybutadienes having a number-average molecular weight of from 500 to 10 000 g/mol and containing at least 10 mol % of 1,2-pendant vinylic double bonds, based on all of the vinylic double bonds present in the polybutadiene, b) 1–30 parts by weight of one or more unsaturated aromatic monomers selected from the group consisting of styrene, α-methylstyrene and vinyltoluene, c) 30–80 parts by weight of one or more hydroxyalkyl esters of acrylic or methacrylic acid having primary hydroxyl groups, d) 0–30 parts by weight of one or more cycloaliphatic esters of acrylic or methacrylic acid and $C_3$ to $C_{12}$ monoalcohols, e) 10–60 parts by weight of one or more aliphatic esters of acrylic or methacrylic acid and $C_1$ to $C_8$ monoalcohols, f) 0.1–5 parts by weight of one or more α,β-unsaturated $C_3$–$C_7$ monocarboxylic or dicarboxylic acids or of one or more monoesters of maleic acid or fumaric acid and $C_1$ to $C_{14}$ monoalchols, and g) 0–30 parts by weight of other copolymerizible compounds different from the compounds of components a)–f), the sum of the parts by weight of components a) to g) being in each case 100.

The present invention is also directed to a method of producing coatings, adhesive bonds or mouldings including adding one or more auxiliaries and/or additives selected from the group consisting of plasticizers, pigments, fillers, catalysts, levelling agents, thickeners, stabilizers, adhesion promoters, light stabilizers and UV absorbers to the binder composition described above.

The present invention is further directed to coatings obtainable from the above-described binder compositions as well as to substrates coated with such coatings.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that low-viscosity polyol components based on special high-solids copolymers and special lactone-based polyester-polyols lead to coatings featuring rapid physical drying and quick chemical crosslinking that are distinguished by excellent solvent and chemical resistance and also very high scratch resistance.

The invention accordingly provides binder compositions comprising

A) one or more hydroxy-functional polyacrylate resins,
B) one or more ε-caprolactone-based polyols having an average hydroxy functionality ≧2 and a number-average molecular weight of from 119 to 2000 g/mol,
C) one or more crosslinkers reactive towards OH groups and having an average functionality >1, and
D) optionally solvents, auxiliaries and additives, characterized in that the polyacrylate resins of component A) are prepared by copolymerizing:

a) 0–10 parts by weight of one or more, optionally functional, polybutadienes having a number-average molecular weight of from 500 to 10 000 g/mol and containing at least 10 mol % of 1,2-pendant vinylic double bonds, based on all of the vinylic double bonds present in the polybutadiene,
b) 1–30 parts by weight of one or more unsaturated aromatic monomers selected from the group consisting of styrene, α-methylstyrene and vinyltoluene,
c) 30–80 parts by weight of one or more hydroxyalkyl esters of acrylic or methacrylic acid having primary hydroxyl groups,
d) 0–30 parts by weight of one or more cycloaliphatic esters of acrylic or methacrylic acid and $C_3$ to $C_{12}$ monoalcohols,
e) 10–60 parts by weight of one or more aliphatic esters of acrylic or methacrylic acid and $C_1$ to $C_8$ monoalcohols,
f) 0.1–5 parts by weight of one or more α,β-unsaturated $C_3$–$C_7$ monocarboxylic or dicarboxylic acids or of one or more monoesters of maleic acid or fumaric acid and $C_1$ to $C_{14}$ monoalchols, and
g) 0–30 parts by weight of other copolymerizible compounds different from the compounds of components a)–f), the sum of the parts by weight of components a) to g) being in each case 100.

The copolymers of component A) are preferably composed of:

a) 0.1–8 parts by weight of one or more, optionally functional, polybutadienes having a number-average molecular weight of from 500 to 5000 g/mol and containing at least 20 mol % of 1,2-pendant vinylic double bonds, based on all the vinylic double bonds present in the polybutadiene,
b) 2–28 parts by weight of styrene,
c) 35–70 parts by weight of one or more compounds from the group consisting of hydroxyethyl acrylate, hydroxyethyl methacrylate and butane-1,4-diol monoacrylate,
d) 0–25 parts by weight of one or more cycloaliphatic esters of acrylic or methacrylic acid and $C_3$ to $C_{12}$ monoalcohols,
e) 15–60 parts by weight of one or more esters of acrylic or methacrytlic acid and aliphatic $C_1$ to $C_8$ monoalcohols,
f) 0.3–4 parts by weight of one or more compounds from the group consisting of acrylic aicd, methacrylic acid, maleic monoesters and fumaric monoesters of the acids in question and $C_1$ to $C_8$ monoalcohols, and
g) 0–25 parts by weight of one or more compounds from the group consisting of acrylonitrile, methacrylonitrile, hydroxypropyl(meth)acrylate, vinyl esters of aliphatic, optionally branched $C_1$ to $C_{10}$ monocarboxylic acids, and dialkyl or dicycloalkyl esters of maleic or fumaric acid and $C_3$ to $C_8$ monoalcohols, the sum of the parts by weight of components a) to g) being 100.

The copolymers of component A) are very preferably composed of:

a) 0.2–6.0 parts by weight of one or more, optionally functional, polybutadienes having a number-average molecular weight of from 500 to 3000 g/mol and containing at least 30 mol % of 1,2-pendant vinylic double bonds, based on all the vinylic double bonds present in the polybutadiene,
b) 5–25 parts by weight of styrene,
c) 40–65 parts by weight of hydroxyethyl acrylate, hydroxyethyl methacrylate or mixtures thereof,
d) 0–20 parts by weight of one or more compounds from the group consisting of isobornyl acrylate, isobornyl methacrylate, cyclohexyl (meth)acrylate, 3,5,5-trimethylcyclohexyl (meth)acrylate and 4-tert-butylcyclohexyl (meth)acrylate,
e) 20–50 parts by weight of one or more esters of acrylic or methacrylic acid and aliphatic $C_1$ to $C_8$ monoalcohols,
f) 0.5–3 parts by weight of acrylic acid, methacrylic acid or mixtures thereof,
g) 0–20 parts by weight of one or more compounds from the group consisting of acrylonitrile, methacrylonitrile, hydroxypropyl (meth)acrylate, vinyl esters of aliphatic, optionally branched $C_1$ to $C_{10}$ monocarboxylic acids,.and dialkyl or dicycloalkyl esters of maleic or fumaric acid and $C_3$ to $C_8$ monoalcohols, the sum of the parts by weight of components a) to g) being 100.

The copolymers of component A) are composed with very particular preference of:

a) 0.4–5 parts by weight of one or more, optionally functional, polybutadienes having a number-average molecular weight of from 500 to 2000 g/mol and containing at least 40 mol % of 1,2-pendant vinylic double bonds, based on all the vinylic double bonds present in the polybutadiene,
b) 5–20 parts by weight of styrene,
c) 40–60 parts by weight of hydroxyethyl acrylate, hydroxyethyl methacrylate or mixtures thereof,
d) 0–15 parts by weight of one or more compounds from the group consisting of isobornyl acrylate, isobornyl methacrylate, cyclohexyl (meth)acrylate, 3,5,5-trimethylcyclohexyl (meth)acrylate and 4-tert-butylcyclohexyl (meth)acrylate,
e) 25–45 parts by weight of one or more esters of acrylic or methacrylic acid and aliphatic $C_1$ to $C_4$ monoalcohols,
f) 0.5–2 parts by weight of acrylic acid, methacrylic acid or mixtures thereof, and
g) 0–15 parts by weight of one or more compounds from the group consisting of hydroxypropyl (meth)acrylate, vinyl esters of aliphatic, optionally branched $C_1$ to $C_9$ monocarboxylic acids, dialkyl or dicycloalkyl esters of maleic or fumaric acid and $C_3$ to $C_6$ monoalcohols, the sum of the parts by weight of components a) to g) being 100.

The preparation of the resins of component A) that are essential to the invention is carried out by copolymerizing constituents a) to g) in accordance with customary methods familiar to the person skilled in the art [Houben-Weyl (ed.): Methods of Organic Chemistry, 4th ed., E 20/2. Thieme, Stuttgart 1987, p. 1156], preference being given to a free-radical solution polymerization of components a)–g) at temperatures from 140 to 240° C. in the presence of free-radical initiators.

The monomers and/or oligomers a) to g) are generally nearly incorporated into the copolymer in the same ratios as used for the polymerization. The incorporated units are distributed essentially at random.

Suitable starting materials a) for the copolymers A) essential to the invention are in principle all polybutadienes having a number-average molecular weight of 500–10000 g/mol that contain at least 10 mol %, preferably at least 20 mol %, more preferably at least 40 mol % and very preferably 40–95 mol % of vinylic double bonds in pendant 1,2 position, based on all of the vinyl double bonds present in the polybutadiene.

Compounds of component a) typically used are polybutadiene isomer mixtures of whose vinylic double bonds from 10 to 95 mol % are in 1,2 position, from 5 to 70 mol % are in 1,4-cis and/or 1,4-trans position and from 0 to 30 mol % are present in cyclic structures.

The polybutadienes used may optionally also carry functional groups, such as hydroxyl groups, carboxyl groups or epoxide groups, for example.

An overview of suitable polybutadienes of the aforementioned kind is in "Makromolekule" by H. G. Elias, 4th edition, Hüithig and Wepf-Verlag, Basel, Heidelberg, New York, pages 676 and also 744 to 746 and 1012 ff.

The preparation of the copolymers A) can be conducted in the presence of a solvent. Examples of those suitable for this purpose include aliphatic, cycloaliphatic and/or aromatic hydrocarbons, such as alkylbenzenes, e.g. toluene, xylene; esters, such as ethyl acetate, n-propyl acetate, isopropyl acetate, n-butyl acetate, n-hexyl acetate, 2-ethylhexyl acetate, ethyl propionate, butyl propionate, pentyl propionate, ethylene glycol monoethyl ether acetate, the corresponding methyl ether actate; ethers such as ethylene glycol acetate monomethyl, monoethyl or monobutyl ether; ketones such as acetone, methyl ethyl ketone, methyl isobutyl ketone, methyl n-amyl ketone or mixtures of such solvents.

Besides a solvent of the aforementioned kind it is also possible during the copolymerization for the polyol component B) to be present, in its entirety or in part, and/or for lactones, such as ε-caprolactone, for example, to be present in addition.

The copolymers A) can be prepared continuously or batchwise.

In the case of continuous preparation the monomer mixture and the initiator are metered uniformly and continuously into a polymerization reactor and at the same time the corresponding amount of polymer is taken off continuously, so that very uniform copolymers are obtained.

In the case of a batchwise preparation monomer mixture and initiator are metered into the polymerization reactor and the polymer remains in the reactor.

In order to maximize the uniformity of the synthesis of the copolymers, monomer mixture and initiator are metered into the reactor at a constant rate.

Uniform copolymers for the purposes of the invention are copolymers having a narrow molecular weight distribution and a low polydispersity of preferably P≦2.5 and also virtually identical monomer composition of the molecule chains.

Generally speaking, copolymerization takes place in the temperature range from 140 to 240° C., preferably 145 to 220° C. and more preferably 150 to 200° C.

The copolymerization can be conducted under a pressure of up to 15 bar.

The initiators are used in amounts of from 0.05 to 15% by weight, preferably 1 to 10% by weight, in particular 2 to 8% by weight, based oithe total amount of components a) to g).

Suitable initiators for the preparation of the copolymers A) are customary free-radical initiators on an azo or peroxide basis, but only those which within the abovementioned temperature range possess a half-life long enough for the polymerization, viz from about 5 seconds to 30 minutes. Suitable examples include 2,2'-azobis(2-methylpropanenitrile), 2,2'-azobis(2-methylbutanenitrile), 1,1'-azobis(cyclohexanecarbonitrile), tert-butyl peroxy-2-ethylhexanoate, tert-butylperoxydiethyl acetate, tert-butyl peroxyisobutyrate, 1,1-di-tert-butylperoxy-3,3,5-trimethylcyclohexane, 1,1-di-tert-butylperoxycyclohexane, tert-butyl peroxy-3,5,5-trimethylhexanoate, tert-butyl peroxyisopropyl carbonate, tert-butyl peroxyacetate, tert-butyl peroxybenzoate, dicumyl peroxide, tert-butyl cumyl peroxide, di-tert-butyl peroxide and di-tert-amyl peroxide.

The compounds of component B) are ε-caprolactone-based polyols having an OH functionality of ≧2, preferably ≧2.5, more preferably ≧3, very preferably 3–8, a number-average molecular weight of from 119 to 2500 g/mol, preferably 119 to 2200 g/mol, more preferably 119 to 2000 g/mol and very preferably 119 to 1500 g/mol. The hydroxyl content of the polyols of component B) is 1.0 to 50% by weight, preferably 1.3 to 45% by weight, more preferably 1.6 to 40% by weight and very preferably 9.0 to 36% by weight.

The polyols of component B) are prepared using monomeric or oligomeric polyols with an average OH functionality ≧2, preferably ≧2.5 more preferably 3–8, which are reacted with ε-caprolactone in a ring-opening reaction. Examples of suitable polyols in this context include ethylene glycol, diethylene glycol, propylene glycol, butane-1,4-diol, butane-1,3-diol, hexane-1,6-diol, neopentylglycol, cyclohexane-1,4-dimethanol, trimethylolpropane, trimethylolethane, pentaerythritol, trishydroxyethyl isocyanurate, glycerol and sorbitol.

The reaction of the said starting polyols with ε-caprolactone is known to the person skilled in the art [A. Balas, G. Palka, J. Foks and H. Janik, J. Appl. Polym. Sci. 29 (1984) 2261] and takes place at temperatures from 100 to 250° C., preferably 120 to 200° C. and more preferably 140 to 180° C. It can be accelerated by means of catalysts, such as organotin compounds such as dibutyltin dilaurate, for example.

The resultant polyols containing ε-caprolactone can be modified further for example by reaction with diphenyl carbonate or dimethyl carbonate to give ε-caprolactone-containing polyols containing carbonate groups and ester groups.

The above-described ε-caprolactone-based polyols of component B) are colourless, viscous resins which are highly compatible with the polyacrylates of component A).

The hydroxyl group content (based on resin solids) of the binder components A) and B) together amounts to 4.0 to 20.0% by weight, preferably 4.5 to 17.0% by weight, more preferably 5.0 to 14.0% by weight and fairly preferably 5.5 to 12.0% by weight.

Besides the polyols of components A) and B) it is in principle also possible to use further organic polyhydroxyl compounds and/or known from polyurethane coating technology and/or amine-type reactive diluents or blends of these polyols and amine-type reactive diluents. These other polyhydroxyl compounds may be the customary polyester-, polyether-, polycarbonate-, polyurethane- or polyacrylate-polyols.

As further organic polyhydroxyl compounds, if such compounds are employed at all in addition to A) and B), it is preferred to use the conventional polyacrylate-polyols and/or polyester-polyols of the prior art. The amine-type reactive diluents can be products containing blocked amino groups, such as aldimines or ketimines, for example, or products containing amino groups which are still free but whose reactivity is attenuated, such as aspartic esters, for example. As a general rule the amino-type reactive diluents contain more than one (blocked) amino group, and so, during the crosslinking reaction, contribute to the construction of the polymeric coating film network.

In the case of the inventive use of the binder components essential to the invention, composed of A) and B), they can be employed in a blend with up to 50%, preferably up to 30%, by weight of other polyols and/or amine-type reactive diluents of the kind exemplified.

More preferably, however, polyols of components A) and B) are used exclusively.

A special method to synthesize the polyol components of the present invention is to polymerize the monomers of the polyols A) at least partially in the presence of the polyols B).

Reagents suitable as components C) of the binder compositions of the invention include all crosslinking reagents that are known to the person skilled in the art and which, by chemical reactions with hydroxyl groups, lead to curing. These can be blocked or non-blocked polyisocyanates, epoxides, carboxylic anhydrides, phenolic resins, resole resins, urea resins, guanidine resins, amino resins, e.g. melamine derivatives, such as alkoxylated melamine resins or melamine-formaldehyde condensation products (e.g. FR-B 943411, from D. H. Solomon in "The Chemistry of Organic Filmformers", pages 235–240, John Wiley & Sons, Inc., New York, 1967) or mixtures of the aforementioned crosslinking reagents.

Suitable preferred crosslinkers of component C) include the polyisocyanates which are known per se in coating chemistry and contain urethane, uretdione, allophanate, biuret, iminooxadiazinedione and/or isocyanurate groups, these polyisocyanates being in optionally wholly or partly NCO-blocked form and being obtainable by means of modifications, known to the person skilled in the art, of monomeric aliphatic, cycloaliphatic, araliphatic and/or aromatic diisocyanates. Examples of diisocyanates include 1,6-diisocyanatohexane, 1-isocyanato-3,3,5-tri-methyl-5-isocyanatomethylcyclohexane (isophorone diisocyanate), 4,4-diisocyanatodicyclohexylmethane, 1,4-diisocyanatocyclohexane, 1-methyl-2,4-diisocyanatocyclohexane, 1-methyl-2,6-diisocyanatocyclohexane and mixtures thereof, 4-isocyanatomethyl-1,8-octane diisocyanate will be used without further modification.

Optionally C) may also include diisocyanatotoluene (TDI) and its isomer mixtures containing up to 35% by weight of 2,6-diisocyanatotoluene, based on the total amount of TDI.

The preparation of these paint polyisocyanates, starting from monomeric diisocyanates, is familiar to the person skilled in the art and is described on the following pages with reference to relevant literature. It is immaterial in this context whether the diisocyanates used have been prepared by phosgene processes or phosgene-free processes.

The paint polyisocyanates of the aforementioned kind preferably have an NCO group content of 5 to 25% by weight, an average NCO functionality of 2.0 to 5.0, preferably 2.8 to 4.0, and a residual amount of monomeric diisocyanates, used for their preparation, of below 1% by weight, preferably below 0.5% by weight.

Preferred paint polyisocyanates of the aforementioned kind are those containing aliphatically and or cycloaliphatically attached free isocyanate groups;

The aforementioned paint polyisocyanates may also contain fully or partly blocked NCO groups. Methods of preparing blocked polyisocyanates and also blocking reagents are known to the person skilled in the art. Preferred blocking agents are,. for example, ε-caprolactam, butanone oxime, 3,5-dimethyl-pyrazole, triazole, phenol, phenol derivatives, secondary amines and/or alkyl malonates.

Paint polyisocyanates containing urethane groups, for example, are the reaction products of 2,4- and optionally 2,6-diisocyanatotoluene or 1-methyl-2,4- and optionally 1-methyl-2,6-diisocyanatocyclohexane with substoichiometric amounts of trimethylolpropane or its mixtures with simple diols, such as the isomeric propanediols or butanediols, for example. The preparation of paint polyisocyanates of this kind containing urethane groups, in virtually monomer-free form, is described in, for example, DE-A 109 01 96.

Particularly preferred paint polyisocyanates are those of the aforementioned kind containing biuret, isocyanurate and/or iminooxadiazinedione structures. Paint polyisocyanates containing biuret groups, and their preparation, are described, in, for example, EP-A 0 003 505, DE-A 110 139 4, U.S. Pat. No. 3,358,010 or U.S. Pat. No. 3,903,127.

The paint polyisocyanates containing isocyanurate groups include the single-type or mixed trimers of the diisocyanates exemplified above, such as, for example, the TDI-based polyisocyanates containing isocyanurate groups, in accordance with GB-A 1 060 430, GB-A 1 506 373 or GB-A 1 485 564, and the mixed trimers of TDI with 1,6-diisocyanatohexane, which are obtainable in accordance, for example, with DE-A 164 480 9 or DE-A 314 467 2. Paricularly preferred paint polyisocyanates containing isocyanurate groups are the aliphatic, aliphatic/cycloaliphatic and/or cycloaliphatic single-type or mixed trimers based on 1,6-diisocyanatohexane and/or isophorone diisocyanate, which are obtainable in accordance, for example, with U.S. Pat. No. 4,324,879, U.S. Pat. No. 4,288,586, DE-A 310 026 2, DE-A 310 026 3, DE-A 303 386 0 or DE-A 314 467 2.

Paint polyisocyanates containing iminooxadiazinedione groups, and their preparation, can be found in, for example, EP-A 798 299, EP-A 896 009, EP-A 962 454 and EP-A 962 455.

In the binder compositions of the invention the ratio between OH-reactive functions of component C) and the hydroxyl groups of components A)+B) is 5:1 to 1:2, preferably 1.5:1 to 1:1.2.

In one preferred embodiment of the invention the mixture of components A) to C) is composed of 40 to 65 parts by weight of A), 1 to 25 parts by weight of B) and 25 to 59 parts by weight of C), the stated amounts adding up to 100.

In one particularly preferred embodiment of the invention the mixture of components A) to C) is composed of 40 to 60 parts by weight of A), 2 to 20 parts by weight of B) and 30 to 50 parts by weight of C), the stated amounts adding up to 100.

In the binder compositions of the invention components A)–C) may also be accompanied, as component D), by the solvents known per se to the person skilled in the art and also by auxiliaries and additives.

Examples of suitable, optional solvents include the following: ethyl acetate, n-propyl acetate, isopropyl acetate, n-butyl acetate, n-hexyl acetate, n-heptyl acetate, 2-ethylhexyl acetate, methoxypropyl acetate, methyl ethyl ketone, methyl isobutyl ketone, toluene, xylene, higher aromatics mixtures, white spirit or any desired mixtures of these solvents.

Where solvents are used, their amount relative to the overall binder composition is 5 to 50% by weight, preferably 10 to 45% by weight.

Examples of further auxiliaries and additives, to be used as well if desired, include plasticizers, such as tricresyl phosphate, phthalic diesters, chlorinated paraffins; pigments and fillers, such as titanium dioxide, barium sulfate, chalk, carbon block; catalysts, such as N,N-dimethylbenzylamine, N-methylmorpholine, zinc octoate, tin(II) octoate or dibutyltin dilaurate, for example; levelling agents; thickeners; optionally stabilizers, such as substituted phenols; silanes with organic functional groups as adhesion promoters, and also light stabilizers and UV absorbers. Examples of such light stabilizers including sterically hindered amines, as described in DE-A 241 735 3 and DE-A 245 686 4, for example. Particularly preferred light stabilizers are bis(1,2,2,6,6-pentamethylpiperid-4-yl) sebacate, bis(2,2,6,6-tetramethylpiperid-4-yl) sebacate, and bis(1,2,2,6,6-pentamethylpiperid-4-yl) n-butyl(3,5-di-tert-butyl-4-hydroxybenzyl) malonate.

The moisture adhering to the fillers and pigments can be removed by drying beforehand or by additionally using water-absorbing substances, such as molecular sieve zeolites, for example.

The solvents, auxiliaries and additives can be added either to the finished mixture of components A)–C) or to the individual components prior to their mixing.

The viscosity of the binder compositions of the invention, measured immediately after the combining of components A) to C) and of all optional constituents, is 20 to 40 s (efflux time from ISO 5 mm cup at 23° C.) for a solids content of 50 to 70% by weight.

The pot life of the binder compositions of the invention varies with the reactivity of components A)+B) with the crosslinker component C). The use of blocked isocyanates in component C), for example, leads to only a very slow reaction rate, so that the corresponding binder compositions cure only on thermal baking and are therefore stable on storage at room temperature.

The use of non-blocked isocyanates leads at room temperature to processing times for the binder compositions of the invention of about 1 to 24 hours.

The coating films produced from the binder compositions of the invention can be dried, when polyisocyanates free from blocking agents are used in component C), at room temperature and in principle their drying does not require any raising of the temperature. In order to shorten the drying time or curing time, of course, depending on application area and substrate, it is possible to apply a raising of the temperature to, for example, 60 to 200° C. for a period of up to 60 minutes.

When using crosslinkers possessing a relatively slow rate of reaction with OH groups, such as blocked polyisocyanates, for example, it is sensible to conduct curing at temperatures from 100 to 240° C., preferably 120 to 220° C., for a period of from 1 to 60 minutes.

In the ready-to-apply state the coating materials based on the binder combinations of the invention feature a high solids content and low solvent contents in conjunction with low viscosity.

The coating films which result after curing have a high hardness, a good elasticity, excellent weather, solvent and chemical resistance, very good scratch resistance and a high gloss. The curing times both for physical initial drying and for chemical crosslinking are short, so that utility articles coated accordingly are very soon resistant to solvents and chemicals and can be taken into service.

The coating compositions of the invention are therefore suitable in particular for the coating of large vehicles, such as aircraft, rail carriages and wagons, trams, lorry chassis and the like. A further preferred field of use consists in their use as automotive OEM and automotive refinish material. The coating materials are further suitable for corrosion protection applications, such as the coating of bridges and transmission towers, for general industrial coating, the coating of wood and of furniture, for the coating of plastics, and glass coating.

The binder compositions of the invention are applied by customary methods, by for example spraying, pouring, dipping, flow coating, brushing, squirting, or rolling. The coating materials of the invention are suitable not only for producing primers but also for producing intermediate coats and for producing topcoats, especially clearcoats, on the substrates to be coated.

Examples of suitable substrates include optionally preprimed metals, plastics, woods, glasses, stone, ceramic, concrete, etc.

EXAMPLES

All percentages are by weight unless noted otherwise.

Characteristic data determined were the solids content (thick film method: lid, 1 g sample, 1 h 125° C., convection oven, based on DIN EN ISO 3251), the acid number (mg KOHlg sample, titration with 0.1 mol/l NaOH solution, based on DIN 53402), the viscosity (rotational viscometer VT 550 from Haake GmbH, Karlsruhe, DE, MV-DIN cup for viscosity <10000 mPas/23° C.), the OH number (mg KOH/g sample, acetylation, hydrolysis, titration rate 0.1 mol/l NaOH, based on DIN 53240) and the Hazen colour number (Hazen colour number to DIN 53995, colour number measuring instrument Lico® 400, Dr. Lange GmbH, Berlin, DE). The acid number and OH number are stated both for the as-supplied form (asf) and for the solid resin (SR). The OH content can be calculated from the OH number by dividing by 33.

Example 1

Preparation Instructions for the Inventively Essential Copolymers A1 to A8

A 5 l stainless steel pressure reactor with stirrer, distillation equipment, reservoir vessel for monomer mixture and initiator, including metering pumps, and automatic temperature regulation was charged with fraction 1, which was heated under $N_2$ to the desired polymerization temperature of 170° C. Then fraction 2 (monomer mixture), in 3 hours, and fraction 3 (initiator solution), in 3.5 hours, were metered in through separate feed ports, beginning together, with the polymerization temperature being held constant (±2° C.). Subsequently the batch was stirred at the polymerization temperature for 60 minutes. It was then cooled to room temperature and the solids content was measured. The copolymers ought to have a solids content of 70±1%. If the solids content was ≦68%, activation was repeated with 5% of the original amount of initiator at 150° C. for 30 minutes. If the solids content was between 68% and 69%, distillation was carried out to bring it to 70±1%. The copolymer A7 has a solids content of 80±1%. Thereafter the copolymers were filtered through a filter (Supra T5500, pore size 25–72 μm, Seitz-Filter-Werke GmbH, Bad Kreuznach, DE). The compositions of fractions I to III and the characteristic data of the products obtained are set out in the table below.

| Solid contents: | 99.5% by weight |
| Viscosity at 23° C.: | 4100 mPa · s |
| Acid number: | 0.5 mg KOH/g |
| Hydroxyl number: | 881 mg KOH/g |
| Hydroxyl content: | 26.7% by weight |
| Hazen colour number: | 44 APHA |
| Appearance: | clear |

| Copolymer | A1 | A2 | A3 | A4 | A5 | A6 | A7 | A8 |
|---|---|---|---|---|---|---|---|---|
| Fraction 1 | | | | | | | | |
| Butyl acetate | 25.00 | 25.00 | 25.00 | 25.00 | 25.00 | 25.00 | 8.68 | 25.00 |
| Xylene | — | — | — | — | — | — | 6.32 | — |
| Fraction 2 | | | | | | | | |
| Styrene | 18.46 | 17.04 | 7.10 | 20.06 | 7.10 | 7.10 | 21.62 | 27.44 |
| Hydroxyethyl methacrylate | 27.12 | 29.82 | 32.52 | 23,96 | 32.52 | 32.52 | 23.20 | 23.00 |
| Butyl acrylate | 21.16 | 19.88 | 22.86 | 22.72 | 26.41 | 27.12 | 16.12 | 17.01 |
| ϵ-Caprolactone | — | — | — | — | — | — | 16.45 | — |
| Isobornyl acrylate | — | — | 3.55 | — | — | — | — | — |
| Polybutadiene Nisso ® B 1000[1] | 0.71 | 0.71 | 1.42 | 0.71 | 1.42 | 0.71 | 0.60 | — |
| Acrylic acid | 0.71 | 0.71 | 0.71 | 0.71 | 0.71 | 0.71 | 0.58 | 0.71 |
| Fraction 3 | | | | | | | | |
| Di-tert-butyl peroxide | 2.84 | 2.84 | 2.84 | 2.84 | 2.84 | 2.84 | 2.43 | 2.84 |
| Butyl acetate | 4.00 | 4.00 | 4.00 | 4.00 | 4.00 | 4.00 | 4.00 | 4.00 |
| Characteristic data | | | | | | | | |
| Solids content % by weight | 70.1 | 70.2 | 70.0 | 70.5 | 69.8 | 70.0 | 80.4 | 70.5 |
| Viscosity at 23° C., mPa · s | 2810 | 4737 | 1571 | 2568 | 1111 | 997 | 4381 | 4810 |
| Acid number, asf, mg KOH/g | 8.5 | 7.9 | 8.7 | 8.2 | 8.9 | 9.0 | 6.2 | 9.0 |
| OH number, asf mg KOH/g | 117 | 128 | 140 | 102 | 138 | 139 | 98 | 97 |
| OH content, SR, % by weight | 5.07 | 5.54 | 6.06 | 4.38 | 5.99 | 6.02 | 3.70 | 4.2 |
| Hazen - colour number, APHA | 38 | 39 | 39 | 15 | 30 | 3 | 35 | 15 |

All quantities are to be understood as in % by weight.
[1] Commercial product of Nippon Soda, Japan Example 2

Polyols B) for Inventive Use

Polyol B1:

A reactor as in Example 1 was charged with 3155 g of trimethylolpropane and 1345 g of ϵ-caprolactone and 2.2 g of dibutyltin dilaurate (DBTL). The contents of the tank were heated to 160° C., stirred at 160° C. for 6 hours and cooled to 20° C., giving a virtually colourless resin having the following characteristic data:

Polyol B2

Analogously to polyol B1, 2746 g of trimethylolpropane and 1754 g of ϵ-caprolactone were reacted in the presence of 2.2 g of DBTL. This gave a resin having the following characteristic data:

| Solids content: | 99.2% by weight |
| Viscosity at 23° C.: | 3403 mPa · s |
| Acid number: | 0.7 mg KOH/g |
| Hydroxyl number: | 765 mg KOH/g |
| Hydroxyl content: | 23.2% by weight |

| | |
|---|---|
| Hazen colour number: | 36 APHA |
| Appearance: | clear |

Polyol B3

Analogously to polyol B1, 2012 g of glycerol and 2488 g of ε-caprolactone were reacted in the presence of 2.2 g of DBTL. This gave a resin having the following characteristic data:

| | |
|---|---|
| Solids content: | 99.4% by weight |
| Viscosity at 23° C.: | 1091 mPa · s |
| Acid number: | 0.9 mg KOH/g |
| Hydroxyl number: | 840 mg KOH/g |
| Hydroxyl content: | 25.5% by weight |
| Hazen colour number: | 32 APHA |
| Appearance: | clear |

Polyol B4

Analogously to polyol B1, 1266 g of trimethylolpropane and 3231 g of ε-caprolactone were reacted in the presence of 2.2 g of DBTL. This gave a resin having the following characteristic data:

| | |
|---|---|
| Solids content: | 99.9% by weight |
| Viscosity at 23° C.: | 1631 mPa · s |
| Acid number: | 0.6 mg KOH/g |
| Hydroxyl number: | 356 mg KOH/g |
| Hydroxyl content: | 10.8% by weight |
| Hazen colour number: | 16 APHA |
| Appearance: | clear |

Polyol B5

Analogously to polyol B1, 2430 g of trimethylolpropane and 2070 g of ε-caprolactone were reacted in the presence of 2.2 g of DBTL. This gave a resin having the following characteristic data:

| | |
|---|---|
| Solids content: | 99.4% by weight |
| Viscosity at 23° C.: | 2602 mPa · s |
| Acid number, asf/SR: | 0.9 mg KOH/g |
| Hydroxyl number, asf/SR: | 640/644 mg KOH/g |
| Hydroxyl content: | 19.4% by weight |
| Hazen colour number: | 54 APHA |
| Appearance: | clear |

Polyol B6

Analogously to polyol B1, 1757 g of trishydroxyethyl isocyanurate and 2743 g of ε-caprolactone were reacted in the presence of 2.2 g of DBTL. This gave a resin having the following characteristic data:

| | |
|---|---|
| Solids content: | 99.5% by weight |
| Viscosity at 23° C.: | 3245 mPa · s |
| Acid number: | 1.0 mg KOH/g |
| Hydroxyl number: | 300 mg KOH/g |
| Hydroxyl content: | 9.1% by weight |

| | |
|---|---|
| Hazen colour number: | 52 APHA |
| Appearance: | clear |

Polyol B7

Desmophen® C 200, a solvent-free aliphatic polycarbonate ester having a hydroxyl group content of 1.7% by weight, product of Bayer AG, Leverkusen, DE.

Comparative Example 1

Reconstitution of copolymer 2 in accordance with the information of EP-A 638 591 as comparative resin C1

A reactor as in Example 1 was charged with fraction 1 [690 g of Cardura® E10 (glycidyl ester from Resolution Belgium S.A., Ottignies-Louvain-La-Neuve)] and this initial charge was heated to 185° C. Then fraction 2 [monomer mixture of 222 g of acrylic acid, 758 g of hydroxyethyl methacrylate, 965 g of isobornyl acrylate, 127 g of methyl methacrylate and 606 g of styrene], over 6 hours, and fraction 3 [initiator solution of 52 g of di-tert-butyl peroxide and 180 g of butyl acetate], likewise over 6 hours, were metered in through separate feed ports, beginning together, with the polymerization temperature held constant at 185° C. (±2° C.). The batch was subsequently stirred at 185° C. for 120 minutes and cooled to 40° C. and the solids content was measured. A solids content of 94.7% by weight was found. The contents of the vessel were subsequently adjusted to a solids content of 75% by weight with 946 g of butyl acetate, cooled to room temperature and filtered (Supra T5500, pore size 25–72 μm, Seitz-Filter-Werke GmbH, Bad Kreuznach, DE).

A product having the following characteristic data was obtained:

| | |
|---|---|
| Solids content: | 74.8% |
| Viscosity at 23° C.: | 6850 mPa · s |
| Acid number, asf/SR: | 8.4/11.2 mg KOH/g |
| Hydroxyl number, asf/SR: | 111/148 mg KOH/g |
| Hazen colour number: | 58 APHA |
| Appearance: | clear |

Comparative Example 2

Reconstitution of copolymer A3 in accordance with the information of EP-A778 298 as comparative resin C2

A reactor as in Example 1 was charged with fraction 1 [675 g of butyl acetate, 423 g of 1-decene and 378 g of VeoVa® 9 (vinyl ester from Resolution Belgium S.A., Ottignies-Louvain-La-Neuve)] and this initial charge was heated to 190° C. Then fraction 2 [monomer mixture of 63 g of acrylic acid, 1035 g of hydroxyethyl methacrylate, 36 g of polybutadiene ®Lithene AL (Chemetall GmbH, Frankfurt, DE) and 1485 g of styrene], over 1.5 hours, and fraction 3 [initiator solution of 225 g of di-tert-butyl peroxide and 180 g of butyl acetate], over 1.75 hours, were metered in through separate feed ports, beginning together, with the polymerization temperature held constant at 190° C. (±2° C.). The batch was subsequently stirred at 190° C. for 30 minutes and cooled to 23° C. and the solids content was measured. A solids content of 74.6% by weight was found. The contents of the vessel were subsequently filtered (Supra T5500, pore size 25–72 μm, Seitz-Filter-Werke GmbH, Bad Kreuznach, DE).

A product having the following characteristic data was obtained:

| Solids content: | 74.7% |
|---|---|
| Viscosity at 23° C.: | 6124 mPa · s |
| Acid number, asf/SR: | 12.3/16.5 mg KOH/g |
| Hydroxyl number, asf/SR: | 99/133 mg KOH/g |
| Hazen colour number: | 46 APHA |
| Appearance: | clear |

Comparative Example 3

Preparation of a Polyol Binder Based on a Polyacrylate/Polyester-Polyol Blend as C3

Preparation of the Polyacrylate-Polyol A9:

In analogy to Example 1 a hydroxy-functional copolymer was prepared from the following ingredients at a polymerization temperature and subsequent stirring temperature of 150° C.: fraction 1: 35.00% by weight butyl acetate, fraction 2: 24.68% by weight styrene, 19.15% by weight hydroxyethyl methacrylate, 14.45% by weight butyl acrylate, 0.57% by weight acrylic acid, fraction 3: 2.15% by weight di-tert-butyl peroxide and 4.00% by weight butyl acetate. This gave a polymer solution having the following characteristic data:

| Solids content: | 61.0% |
|---|---|
| Viscosity at 23° C.: | 2412 mPa · s |
| Acid number, asf/SR: | 7.0/11.5 mg KOH/g |
| Hydroxyl number, asf/SR: | 83/136 mg KOH/g |
| Hazen colour number: | 15 APHA |
| Appearance: | clear |

Preparation of the polyester-polyol B8:

877 g of 2-ethylhexane acid and 1853 g of trimethylolpropane were charged to a 5 l stirred tank equipped with a stirrer, a distillation bridge with column and a nitrogen inlet tube and this initial charge was heated to 125° C. During the heating phase one tank volume $N_2$/h was passed through. At 125° C. 1282 g of hexahydrophthalic anhydride and 488 g of adipic aicd were added, the $N_2$ flow was increased to two tank volumes/h and the batch was heated to 210° C. with an overhead temperature limit of max. 102° C. The water of reaction was removed and towards the end a liquid-phase temperature of 210° C. was reached. Condensation was then continued at 210° C. until an acid number of <10 mg KOH/g was reached. This gave 3980 g of a polycondensation product having an acid number of 9.6 mg KOH/g and an OH number of 180 mg KOH/g. 1125 g of xylene were added with stirring to 3375 g of this resin. This gave a solution having a solids content of 75% by weight, an acid number of 7.1 mg KOH/g, an OH number of 135 mg KOH/g and a viscosity of 4661 mPa.s.

Preparation of a Polyacrylate-Polyester-Polyol Blend C3:

65 parts by weight of the polyacrylate-polyol A9 and 35 parts by weight of the polyester-polyol B8 were stirred at 60° C. for 1 hour in a 5 l stirred tank and then cooled to 30° C. and filtered (Supra T5500, pore size 25–72 µm, Seitz-Filter-Werke GmbH, Bad Kreuznach, DE). This gave a polyester/polyacrylate solution, 65% strength in butyl acetate/xylene (3:1), having the following characteristic data:

| Solids content: | 65.1% |
|---|---|
| Viscosity at 23° C.: | 3682 mPa · s |
| Acid number, asf/SR: | 7.0/10.7 mg KOH/g |
| Hydroxyl number, asf/SR: | 101/155 mg KOH/g |
| Hazen colour number: | 25 APHA |
| Appearance: | clear |

Example 3

Preparation of Mixtures of Copolymers A1–A8 with polyols B1–B7

Copolymers and polyols were stirred together with one another in the stated proportions at 60° C. for 60 minutes.

Polyol AB1:

Mixture of copolymer A6) and polyol B1) in a 9:1 ratio (based on solid resin). The resulting mixture was adjusted with butyl acetate to a solids content of 70%, giving a colourless polyol resin having the following characteristic data:

| Solids content: | 70.2% by weight |
|---|---|
| Viscosity at 23° C.: | 963 mPa · s |
| Acid number, asf/SR: | 7.9/11.2 mg KOH/g |
| Hydroxyl number, asf/SR: | 189/269 mg KOH/g |
| Hazen colour number: | 7 APHA |
| Appearance: | clear |

Polyol AB2:

Mixture of copolymer A4) and polyol B1) in a 9:1 ratio (based on solid resin). The resulting mixture was adjusted with butyl acetate to a solids content of 70%, giving a colourless polyol resin having the following characteristic data:

| Solids content: | 69.5% by weight |
|---|---|
| Viscosity at 23° C.: | 1457 mPa · s |
| Acid number, asf/SR: | 7.3/10.5 mg KOH/g |
| Hydroxyl number, asf/SR: | 152/219 mg KOH/g |
| Hazen colour number: | 17 APHA |
| Appearance: | clear |

Polyol AB3:

Mixture of copolymer A8) and polyol B1) in an 86.3:13.7 ratio (based on solid resin). The resulting mixture was adjusted with butyl acetate to a solids content of 70%, giving a colourless polyol resin having the following characteristic data:

| Solids content: | 70.0% by weight |
|---|---|
| Viscosity at 23° C.: | 1663 mPa · s |
| Acid number, asf/SR: | 6.6/9.4 mg KOH/g |
| Hydroxyl number, asf/SR: | 167/239 mg KOH/g |
| Hazen colour number: | 27 APHA |
| Appearance: | clear |

Polyol AB4:

Mixture of copolymer A5) and polyol B3) in a 9:1 ratio (based on solid resin). The resulting mixture was adjusted with butyl acetate to a solids content of 70%, giving a colourless polyol resin having the following characteristic data:

| | |
|---|---|
| Solids content: | 70.2% by weight |
| Viscosity at 23° C.: | 1261 mPa · s |
| Acid number, asf/SR: | 8.1/11.5 mg KOH/g |
| Hydroxyl number, asf/SR: | 186/265 mg KOH/g |
| Hazen colour number: | 32 APHA |
| Appearance: | clear |

Polyol AB5:

Mixture of copolymer A3) and polyol B5) in a 9:1 ratio (based on solid resin). The resulting mixture was adjusted with butyl acetate to a solids content of 70%, giving a colourless polyol resin having the following characteristic data:

| | |
|---|---|
| Solids content: | 70.5% by weight |
| Viscosity at 23° C.: | 1181 mPa · s |
| Acid number, asf/SR: | 8.2/11.6 mg KOH/g |
| Hydroxyl number, asf/SR: | 175/248 mg KOH/g |
| Hazen colour number: | 33 APHA |
| Appearance: | clear |

Polyol AB6:

Mixture of copolymer A7) and polyol B4) in a 9:1 ratio (based on solid resin). The resulting mixture was adjusted with butyl acetate to a solids content of 80%, giving a colourless polyol resin having the following characteristic data:

| | |
|---|---|
| Solids content: | 80.3% by weight |
| Viscosity at 23° C.: | 3303 mPa · s |
| Acid number, asf/SR: | 5.4/6.8 mg KOH/g |
| Hydroxyl number, asf/SR: | 123/154 mg KOH/g |
| Hazen colour number: | 28 APHA |
| Appearance: | clear |

Polyol AB7:

Mixture of copolymer A1) and polyol B7) in a 9:1 ratio (based on solid resin). The resulting mixture was adjusted with butyl acetate to a solids content of 70%, giving a colourless polyol resin having the following characteristic data:

| | |
|---|---|
| Solids content: | 69.8% by weight |
| Viscosity at 23° C.: | 1803 mPa · s |
| Acid number, asf/SR: | 7.5/10.7 mg KOH/g |
| Hydroxyl number, asf/SR: | 109/156 mg KOH/g |
| Hazen colour number: | 34 APHA |
| Appearance: | clear |

Polyol AB8:

Mixture of copolymer A2) and polyol B7) in an 85:15 ratio (based on solid resin). The resulting mixture was adjusted with butyl acetate to a solids content of 70%, giving a colourless polyol resin having the following characteristic data:

| | |
|---|---|
| Solids content: | 70.1% by weight |
| Viscosity at 23° C.: | 2568 mPa · s |
| Acid number, asf/SR: | 6.5/9.3 mg KOH/g |
| Hydroxyl number, asf/SR: | 116/165 mg KOH/g |
| Hazen colour number: | 32 APHA |
| Appearance: | clear |

Polyol AB9:

Mixture of copolymer A7) and polyol B4) in a 95:5 ratio (based on solid resin). The resulting mixture was adjusted with butyl acetate to a solids content of 80%, giving a colourless polyol resin having the following characteristic data:

| | |
|---|---|
| Solids content: | 80.2% by weight |
| Viscosity a 23° C.: | 4154 mPa · s |
| Acid number, asf/SR: | 6.0/7.5 mg KOH/g |
| Hydroxyl number, asf/SR: | 112/140 mg KOH/g |
| Hazen colour number: | 32 APHA |
| Appearance: | clear |

Polyol AB10:

Mixture of copolymer A7) and polyol B4) in an 85:15 ratio (based on solid resin). The resulting mixture was adjusted with butyl acetate to a solids content of 80%, giving a colourless polyol resin having the following characteristic date:

| | |
|---|---|
| Solids content: | 80.2% by weight |
| Viscosity at 23° C.: | 2592 mPa · s |
| Acid number, asf/SR: | 5.1/6.4 mg KOH/g |
| Hydroxyl number, asf/SR: | 130/163 mg KOH/g |
| Hazen colour number: | 25 APHA |
| Appearance: | clear |

Polyol AB11

This example describes the synthesis of a polyacrylate typ A) in the presence of a polyol typ B).

A 15 l stainless steel pressure reactor with a stirrer, distillation equipment, reservoir vessel for monomer mixture and initiator, including metering pumps, and automatic temperature regulation was charged with fraction 1 (3128 g Butyl acetate und 988 g Polyol B1) which was heated under $N_2$ to the polymerization temperature of 170° C. Then fraction 2 (monomer mixture of 2221 g Styrol, 4069 g Hydroxyethyl methacrylate, 2061 g Butyl acrylate, 89 g Polybutadien Nisso B1000 und 89 g Acrylic acid) in 3 hours, and fraction 3 (solution of 355 g Di-tert-butylperoxid und 500 g Butyl acetate) in 3.5 hours, were metered in through separate feed ports, beginning together, with the polymerization temperature held constant (±2° C.). Subsequently the batch stirred at the polymerization temperature for 60 minutes. It was then cooled to room temperature and the solids content was measured. The copolymer ought to have a solids content of 70±1%. If the solids content was ≦68%, activation was repeated with 5% of the original amount of initiator at 150° C. for 30 minutes. If the solids content was between 68% and 69%, distillation was carried out to bring it to 70±1%, Thereafter the product was filtered through a filter (Supra T5500, pore size 25–72 μm, Seitz-Filter-Werke GmbH, Bad Kreuznach, DE). The result was about 13 kg of a Polyol with the following datas:

| | |
|---|---|
| Solids content: | 71.0% by weight |
| Viscosity at 23° C.: | 1742 mPa · s |
| Acid number: | 7.0 mg KOH/g |
| Hydroxyl number: | 198 mg KOH/g |
| Hydroxyl content | 6.0% by weight |
| Hazen colour number: | 24 APHA |
| Appearance | clear |

As compared with the comparative polyols the polyol mixtures of the invention of the AB type are notable for a markedly lower viscosity at comparable solids content and a hydroxyl content which is higher in all cases.

Example 4

Coating Performance Tests

As polyol mixtures for inventive use polyols AB1–AB3, AB7 and AB8 were used. For comparison therewith use was made of the prior art copolymers C1, C2 and C3 and also of copolymer A8, but non-inventively, without combination with a polyol of type B).

The coatings properties were assessed by preparing clearcoat materials. This was done by admixing the polyol mixtures AB1–AB3, AB7, AB8 and the comparative polyols A8, C1, C2 and C3 with 0.1% by weight of Baysilone® OL 17 (levelling agent from Borchers GmbH, Langenfeld, DE), 0.01% by weight Modaflow® (levelling agent from Monsanto Deutschland GmbH, DE, 1% strength by weight in xylene), 1.5% by weight Tinuvin® 384 (UV absorber from Ciba Geigy, Basel, CH, 50% strength by weight in methoxypropyl acetate (MPA)) and 1.0% by weight Tinuvin® 292 (light stabilizer from Ciba Geigy, Basel, CH, 50% strength by weight in MPA) (the quantities in % are in each case based on the underlying amount of solid resin).

Shortly before application the paint polyisocyanate was added, for which an NCO/OH ratio of approximately 1:1 was observed, and the formulations were adjusted with methoxypropyl acetate (MPA) to a viscosity of approximately 35 s (efflux time from ISO 5 mm cup at 23° C.). Prior to processing, the coating material was left to stand for about another 10 minutes for devolatilization.

Paint polyisocyanates used were Desmodur® N 3390 (Bayer AG, Leverkusen, DE), a polyisocyanate containing isocyanurate groups and based on 1,6-diisocyanatohexane, as a 90% strength solution in butyl acetate/Solvesso® 100 (Esso AG, Cologne, DE) (1:1); NCO content of the solution: about 19.4% by weight, and Desmodur® XP 2410 (Bayer AG, Leverkusen, DE), a polyisocyanate containing iminooxadiazinedione groups and based on 1,6-diisocyanatohexane, 100% strength, NCO content about 24% by weight.

The coating materials were applied by spraying in one cross-pass to the prepared substrate. After a flash-off time of 10 to 15 minutes the coating materials were baked at 130° C. for 30 minutes and subsequently stored at 60° C. for 16 h. The dry film thickness was 40±5 μm. Coatings performance testing was begun 2 hours after storage.

Tests were carried out on the film hardness on glass [König Pendulum Damping (DIN EN ISO 1522)], gloss and haze at the 20° angle (DIN 67 530, ISO 2813), incipient dissolubility by xylene, MPA, ethyl acetate and acetone, elasticity [Erichsen cupping (DIN ISO 1520)], resistance to tree resin, brake fluid, pancreatin (50% strength), sodium hydroxide solution (1% strength) and sulphuric acid (1% strength), petrol resistance (DIN 51604), scratch resistance (DIN 55668), thermal yellowing stability (DIN 6174) and condensation resistance (DIN 50017). Additionally the coating materials were subjected to an accelerated weathering test [W-o-m Ci 65/CAM 180 (VDA 621-429/430 SAE J 1960)] and a QUV UVB 313 test (DIN EN ISO 4892 T.3).

| Polyol | AB1 | AB1 | AB2 | AB3 | AB7 | AB8 | A8 | V1 | V2 | V3 |
|---|---|---|---|---|---|---|---|---|---|---|
| Desmodur ® crosslinker | XP 2410 | N 3390 | N 3390 | N 3390 | N 3390 | N 3390 | N 3390 | N 3390 | N 3390 | N 3390 |
| Spray solids content [% by wt] | 65.0 | 63.0 | 59.0 | 60.0 | 58.3 | 57.3 | 55.0 | 54.0 | 56.0 | 52.5 |
| König pendulum damping [s] | 184 | 181 | 184 | 195 | 177 | 165 | 199 | 187 | 189 | 206 |
| Solvent resistance [rating][1] 1 min | 0 0 2 3 | 0 0 1 2 | 0 0 2 3 | 0 1 2 3 | 0 0 2 3 | 0 0 0 3 | 0 1 2 3 | 0 0 2 3 | 0 1 2 3 | 0 0 1 3 |
| (xylene/MPA/EA/acetone) 5 min | 0 0 3 4 | 0 0 3 4 | 0 1 3 4 | 0 1 3 4 | 1 1 3 4 | 0 1 3 4 | 1 1 3 4 | 1 1 3 4 | 1 1 3 4 | 0 0 2 4 |
| Erichsen cupping [mm] | 9.5 | 9.5 | 9.5 | 9.0 | 9.0 | 9.5 | 9.0 | 8.5 | 9.0 | 9.5 |
| Chemical resistance [° C.][2] | | | | | | | | | | |
| Tree resin | 38 | 38 | 38 | 40 | 38 | 38 | 42 | 40 | 38 | 36 |
| Brake fluid | 36 | 36 | 36 | 36 | 36 | 36 | 36 | 36 | 36 | 36 |
| Pancreatin, 50% strength | 36 | 36 | 36 | 36 | 36 | 36 | 36 | 36 | 36 | 36 |
| Sodium hydroxide solution 1% strength | 37 | 43 | 47 | 44 | 40 | 41 | 45 | 38 | 38 | 42 |
| Sulfuric acid, 1% strength | 42 | 45 | 46 | 44 | 42 | 43 | 46 | 42 | 40 | 46 |
| FAM petrol resistance, 10 min [rating][1] | 2 | 2 | 2 | 2 | 1 | 1 | 2 | 2 | 2 | 2 |
| Scratch resistance (laboratory wash unit)[3] | | | | | | | | | | |
| Initial gloss, 20° | 85.8 | 87.0 | 89.1 | 90.0 | 88.6 | 88.7 | 91.1 | 89.5 | 90.2 | 89.0 |
| Loss of gloss (Δgl.) after 10 cycles, 20° | 19.2 | 17.1 | 18.9 | 31.7 | 16.9 | 17.6 | 37.6 | 36.3 | 38.7 | 35.0 |
| Relative residual gloss (RR) [%] | 77.6 | 80.3 | 78.8 | 64.8 | 80.9 | 80.1 | 58.7 | 59.4 | 57.1 | 60.7 |
| RR after reflow 2 h 60° C. [%] | 88.9 | 90.4 | 91.2 | 88.0 | 89.2 | 89.7 | 82.8 | 83.3 | 81.6 | 83.5 |
| Thermal yellowing (S—BC/H$_2$O—BC)[4] | | | | | | | | | | |
| Initial yellowing [b] | 2.4/2.4 | 2.1/2.1 | 2.0/2.1 | 2.0/2.2 | 2.0/2.1 | 2.0/2.2 | 1.9/1.9 | 2.2/2.2 | 2.4/2.4 | 2.2/2.4 |
| Yellowing after 30 min. 150° C. [Δb] | 0.4/0.0 | 0.4/0.0 | 0.4/0.0 | 0.0/0.2 | 0.4/0.0 | 0.4/0.0 | 0.4/0.0 | 0.4/0.0 | 0.4/0.0 | 0.4/0.0 |

-continued

| Polyol | AB1 | AB1 | AB2 | AB3 | AB7 | AB8 | A8 | V1 | V2 | V3 |
|---|---|---|---|---|---|---|---|---|---|---|
| Condensation test (240 h at 40° C.) Damage[5] | None | None | None | None | None | None | B 1/1 | B 1/1 | B 2/2 | B 1/1 |

[1] 0 = best score (no effect), 5 = worst score (coating film completely dissolved at the attacked site),
[2] gradient oven method (the higher the temperature until there is visible damage the more resistant the coating film)
[3] age of the washing brush: about 36 hours of operation
[4] clearcoat on solventborne basecoat/clearcoat on aqueous basecoat
[5] B 1/1: blisters amount/size, none = none found The binder compositions of the invention based on the polyols AB1–AB3, AB7 and AB8 have a very high solids content for a given application viscosity and yield coatings having good solvent and chemical resistance. Petrol resistance, gloss, elasticity, film hardness and thermal yellowing are at a high level, comparable with present-day standard systems (comparative tests) which, however, have a substantially higher solvent content and thus a lower solids content at application viscosity.

Decisive advantages are possessed by the binder compositions of the invention based on the polyols of the AB type in terms of the level of the solids content at application viscosity and in terms of the scratch resistance of the resultant coatings.

The coating compositions of the invention yield coatings having a very high relative residual gloss (especially even after reflow), whereas clearcoat materials based on the standard polyols A8, C1, C2 and C3 achieve very much poorer relative residual gloss and reflow value figures in terms of the scratch resistance.

The test results therefore clearly show that clearcoat materials based on the polyol compositions of the invention have a much higher coating materials solids content than prior art polyols at a given application viscosity and that the coating films, in addition to a comparable level of technical coatings properties, display substantially improved scratch resistance in comparison with 2K PU coating materials based on standard polyols. Accordingly the coating compositions of the invention are especially suitable for the coating of motor vehicles.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Binder compositions comprising
    A) one or more hydroxy-functional polyacrylate resins,
    B) one or more ε-caprolactone-based polyols having an average hydroxy functionality ≧2 and a number-average molecular weight of from 119 to 2000 g/mol, and
    C) one or more crosslinkers reactive with OH groups and having an average functionality>1,
    wherein the polyacrylate resins of component A) are prepared by copolymerizing:
    a) 0.4–10 parts by weight of one or more, optionally functional, polybutadienes having a number-average molecular weight of from 500 to 10 000 g/mol and containing at least 10 mol % of 1,2-pendant vinylic double bonds, based on all of the vinylic double bonds present in the polybutadiene,
    b) 1–30 parts by weight of one or more unsaturated aromatic monomers selected from the group consisting of styrene, α-methylstyrene and vinyltoluene,
    c) 30–80 parts by weight of one or more hydroxyalkyl esters of acrylic or methacrylic acid having primary hydroxyl groups,
    d) 0–30 parts by weight of one or more cycloaliphatic esters of acrylic or methacrylic acid and $C_3$ to $C_{12}$ monoalcohols,
    e) 10–60 parts by weight of one or more aliphatic esters of acrylic or methacrylic acid and $C_1$ to $C_8$ monoalcohols,
    f) 0.1–5 parts by weight of one or more α,β-unsaturated $C_3$–$C_7$ monocarboxylic or dicarboxylic acids or of one or more monoesters of maleic acid or fumaric acid and $C_1$ to $C_{14}$ monoalcohols, and
    g) 0–30 parts by weight of other copolymerizible compounds different from the compounds of components a)–f),
    the sum of the parts by weight of components a) to g) being in each case 100.

2. The binder compositions according to claim 1, wherein the copolymers of component A) are composed of:
    a) 0.4–5 parts by weight of one or more, optionally functional, polybutadienes having a number-average molecular weight of from 500 to 2000 g/mol and containing at least 40 mol % of 1,2-pendant vinylic double bonds, based on all the vinylic double bonds present in the polybutadiene,
    b) 5–20 parts by weight of styrene,
    c) 40–60 parts by weight of hydroxyethyl acrylate, hydroxyethyl methacrylate or mixtures thereof,
    d) 0–15 parts by weight of one or more compounds from the group consisting of isobornyl acrylate, isobornyl methacrylate, cyclohexyl (meth)acrylate, 3,5,5-trimethylcyclohexyl (meth)acrylate and 4-tert-butylcyclohexyl (meth)acrylate,
    e) 25–45 parts by weight of one or more esters of acrylic or methacrylic acid and aliphatic $C_1$ to $C_4$ monoalcohols,
    f) 0.5–2 parts by weight of acrylic acid, methacrylic acid or mixtures thereof, and
    g) 0–15 parts by weight of one or more compounds from the group consisting of hydroxypropyl (meth)acrylate, vinyl esters of aliphatic, optionally branched $C_1$ to $C_9$ monocarboxylic acids, dialkyl or dicycloalkyl esters of maleic or fumaric acid and $C_3$ to $C_6$ monoalcohols, the sum of the parts by weight of components a) to g) being 100.

3. The binder compositions according to claim 1, wherein the ε-caprolactone-based polyols of component B) have an average OH functionality of 3–8, a number-average molecular weight of 119 to 1500 g/mol and a hydroxyl content of 9.0 to 36% by weight.

4. The binder compositions according to claim 1, wherein the ε-caprolactone-based polyols of component B) have been modified by reaction with diphenyl carbonate or dimethyl carbonate.

5. The binder compositions according to claim 1, wherein the crosslinker(s) of component C) include polyisocyanates containing urethane, uretdione, allophanate, biuret, iminooxadiazindione and/or isocyanurate groups and having an NCO group content of 5 to 25% by weight, an average NCO functionality of 2.5 to 5.0, the NCO groups being free or wholly or partly blocked.

6. The binder compositions according to claim 1, wherein the mixture of components A) to C) is composed of 40 to 60 parts by weight of A), 2 to 20 parts by weight of B) and 30 to 50 parts by weight of C), the stated amounts adding up to 100.

7. A method of producing coatings, adhesive bonds or mouldings comprising adding one or more auxiliaries and/or additives selected from the group consisting of plasticizers, pigments, fillers, catalysts, levelling agents, thickeners, stabilizers, adhesion promoters, light stabilizers and UV absorbers to the binder composition according to claim 1.

8. Coatings obtainable from binder compositions according to claim 1.

9. Substrates coated with coatings according to claim 8.

10. The binder composition according to claim 1 further comprising one or more solvents selected from the group consisting of aliphatic hydrocarbons, cycloaliphatic hydrocarbons, aromatic hydrocarbons, esters, ethers, and ketones.

11. The binder composition according to claim 10, wherein the solvents are selected from toluene, xylene, ethyl acetate, n-propyl acetate, isopropyl acetate, n-butyl acetate, n-hexyl acetate, 2-ethylhexyl acetate, ethyl propionate, butyl propionate, pentyl propionate, ethylene glycol monoethyl ether acetate, ethylene glycol monomethyl ether acetate, ethylene glycol acetate monomethyl ether, ethylene glycol acetate monoethyl ether, ethylene glycol acetate monobutyl ether, acetone, methyl ethyl ketone, methyl isobutyl ketone, methyl n-amyl ketone, and mixtures thereof.

12. The binder composition according to claim 1 further comprising one or more auxiliaries and/or additives selected from the group consisting of plasticizers, pigments, fillers, catalysts, levelling agents, thickeners, stabilizers, adhesion promoters, light stabilizers and UV absorbers.

13. The binder composition according to claim 12, wherein the auxiliaries and/or additives are selected from the group consisting of tricresyl phosphate, phthalic diesters, chlorinated paraffins, titanium dioxide, barium sulfate, chalk, carbon block; catalysts, N,N-dimethylbenzylamine, N-methylmorpholine, zinc octoate, tin(II) octoate, dibutyltin dilaurate, substituted phenols; silanes with organic functional groups, sterically hindered amines, bis(1,2,2,6,6-pentamethylpiperid-4-yl) sebacate, bis(2,2,6,6-tetramethylpiperid-4-yl) sebacate, bis(1,2,2,6,6-pentamethylpiperid-4-yl) n-butyl(3,5-di-tert-butyl-4-hydroxybenzyl)malonate and mixtures thereof.

14. The binder compositions according to claim 2, wherein the ε-caprolactone-based polyols of component B) have an average OH functionality of 3–8, a number-average molecular weight of 119 to 1500 g/mol and a hydroxyl content of 9.0 to 36% by weight.

15. The binder compositions according to claim 2, wherein the ε-caprolactone-based polyols of component B) have been modified by reaction with diphenyl carbonate or dimethyl carbonate.

16. The binder compositions according to claim 2, wherein the crosslinker(s) of component C) include polyisocyanates containing urethane, uretdione, allophanate, biuret, iminooxadiazindione and/or isocyanurate groups and having an NCO group content of 5 to 25% by weight, an average NCO functionality of 2.5 to 5.0, the NCO groups being free or wholly or partly blocked.

17. The binder compositions according to claim 2, wherein the mixture of components A) to C) is composed of 40 to 60 parts by weight of A), 2 to 20 parts by weight of B) and 30 to 50 parts by weight of C), the stated amounts adding up to 100.

18. A method of producing coatings, adhesive bonds or mouldings comprising adding one or more auxiliaries and/or additives selected from the group consisting of plasticizers, pigments, fillers, catalysts, levelling agents, thickeners, stabilizers, adhesion promoters, light stabilizers and UV absorbers to the binder composition according to claim 2.

19. Coatings obtainable from binder compositions according to claim 2.

20. Substrates coated with coatings according to claim 19.

* * * * *